United States Patent
Breton et al.

[15] 3,682,092
[45] Aug. 8, 1972

[54] APPARATUS FOR CORING AND PRESSING JUICE FROM FRUITS HAVING A RIND

[72] Inventors: Roger J. Breton, Los Angeles; David F. Beck, San Juan Capistrano, both of Calif.

[73] Assignee: Roto Manufacturing Company, Inc., Westminster, Calif.

[22] Filed: July 16, 1970

[21] Appl. No.: 55,538

[52] U.S. Cl. ....................100/52, 91/318, 100/108, 100/269
[51] Int. Cl. ..................B30b 15/14, B30b 9/02
[58] Field of Search........100/37, 256, 264, 107, 108, 100/109, 50, 51, 52, 218; 91/275, 318

[56] References Cited

UNITED STATES PATENTS

| | | |
|---|---|---|
| 1,182,369 | 5/1916 | Haniquet....................100/52 |
| 2,219,896 | 10/1940 | Harrington et al.......91/318 X |
| 2,253,617 | 8/1941 | Griffith.................100/52 UX |
| 2,522,800 | 9/1950 | Quiroz......................100/107 |
| 2,817,288 | 12/1957 | Peters.........................100/52 |
| 3,162,114 | 12/1964 | Quiroz...................100/108 X |
| 3,269,301 | 8/1966 | Krause...................100/108 X |

*Primary Examiner*—Peter Feldman
*Attorney*—William H. Maxwell

[57] ABSTRACT

An apparatus for juicing fruit having a rind and varying in hardness and size, and performing, generally the steps of supporting a said fruit, cutting an opening through the rind at one side thereof, then confining the said fruit and applying external pressure thereto thereby extruding a core through the opening cut through the rind and delivering the juice from said fruit via said opening and through said extruded core; and including a hydraulically operated and hydraulically responsive mechanism involving a ram that moves the supported whole fruit onto a tubular coring knife that is perforated, thereby cutting an opening through the rind, a pressing head for receiving the said whole fruit which is moved thereinto by the ram which seals in the head, a rind ejector which closes the cylinder so as to oppose the ram, a pressure responsive hydraulic means operating the ram to press the fruit and thereby extrude a core of fruit through said opening cut through the rind and deliver juice from the core, and a core ejector within the coring knife and which is unique in its adaptability to accelerate the rind with the core attached for ejection from the pressing head. The apparatus also includes means responsive to reciprocal motions and timing the functional fruit processing elements.

19 Claims, 15 Drawing Figures

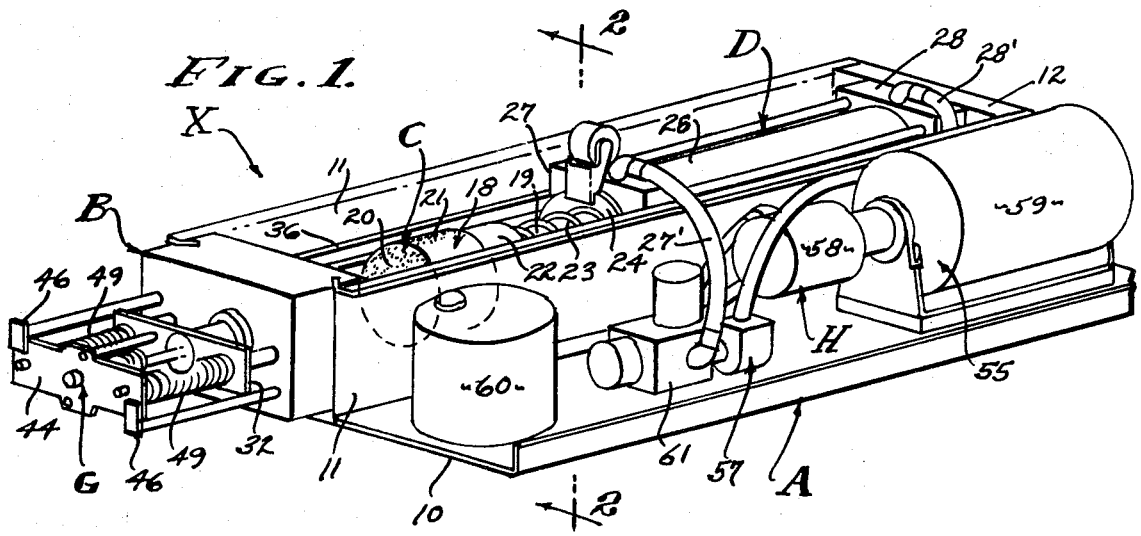
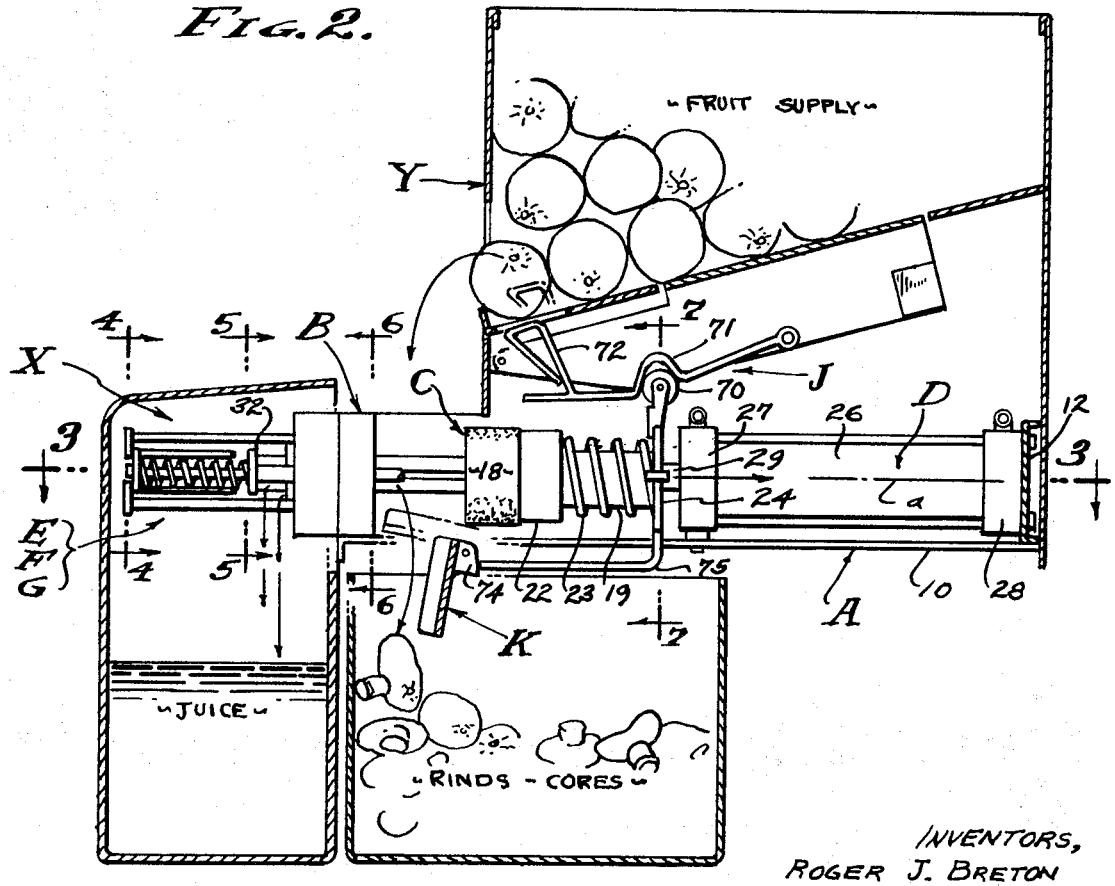

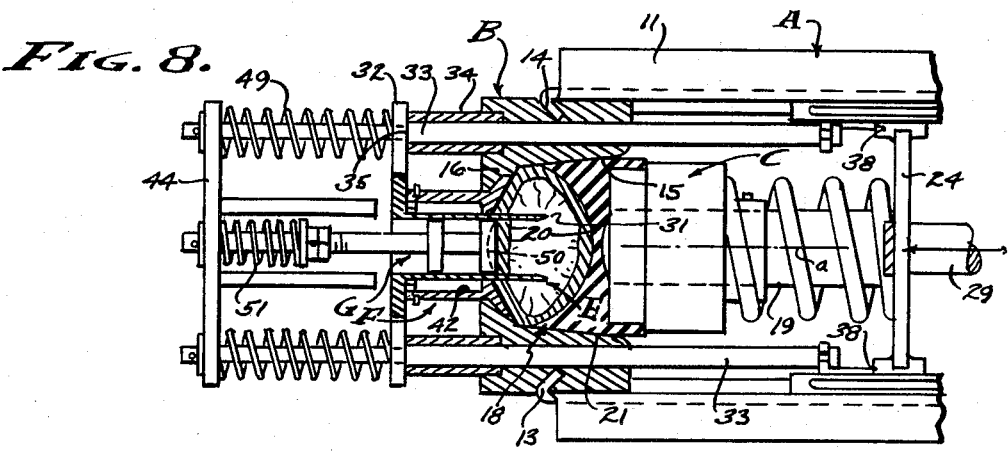
FIG. 8.
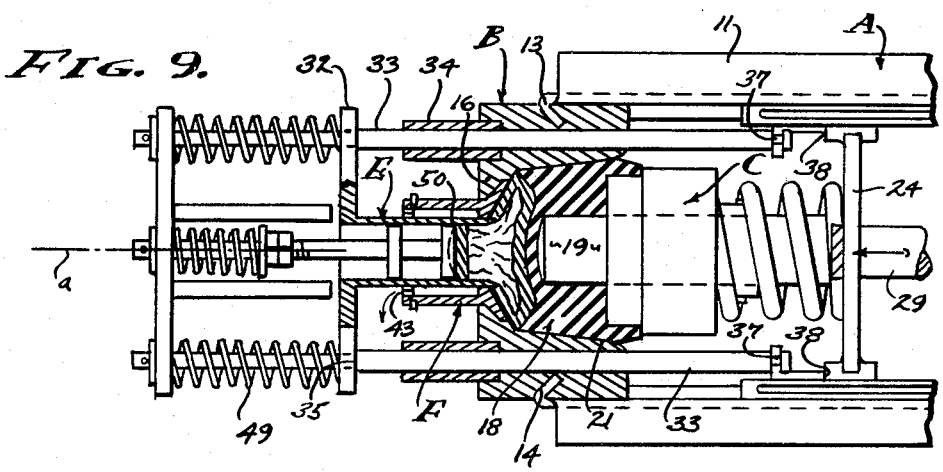
FIG. 9.
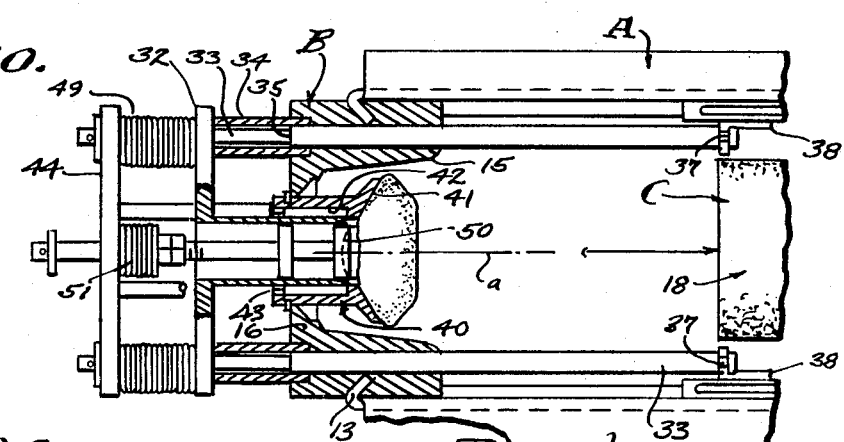
FIG. 10.
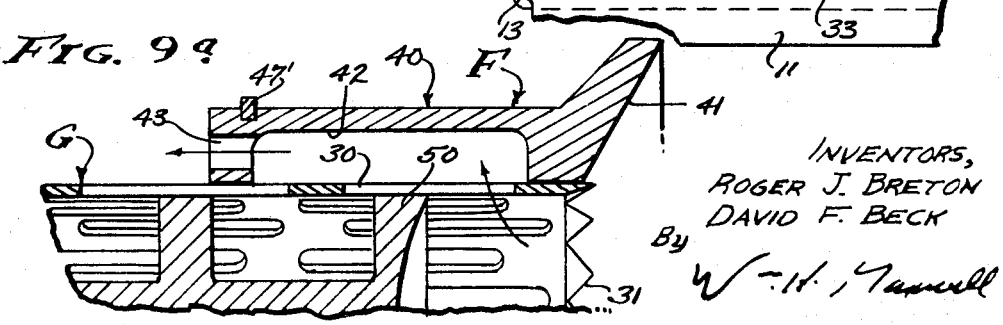
FIG. 9ᵃ.
INVENTORS,
ROGER J. BRETON
DAVID F. BECK

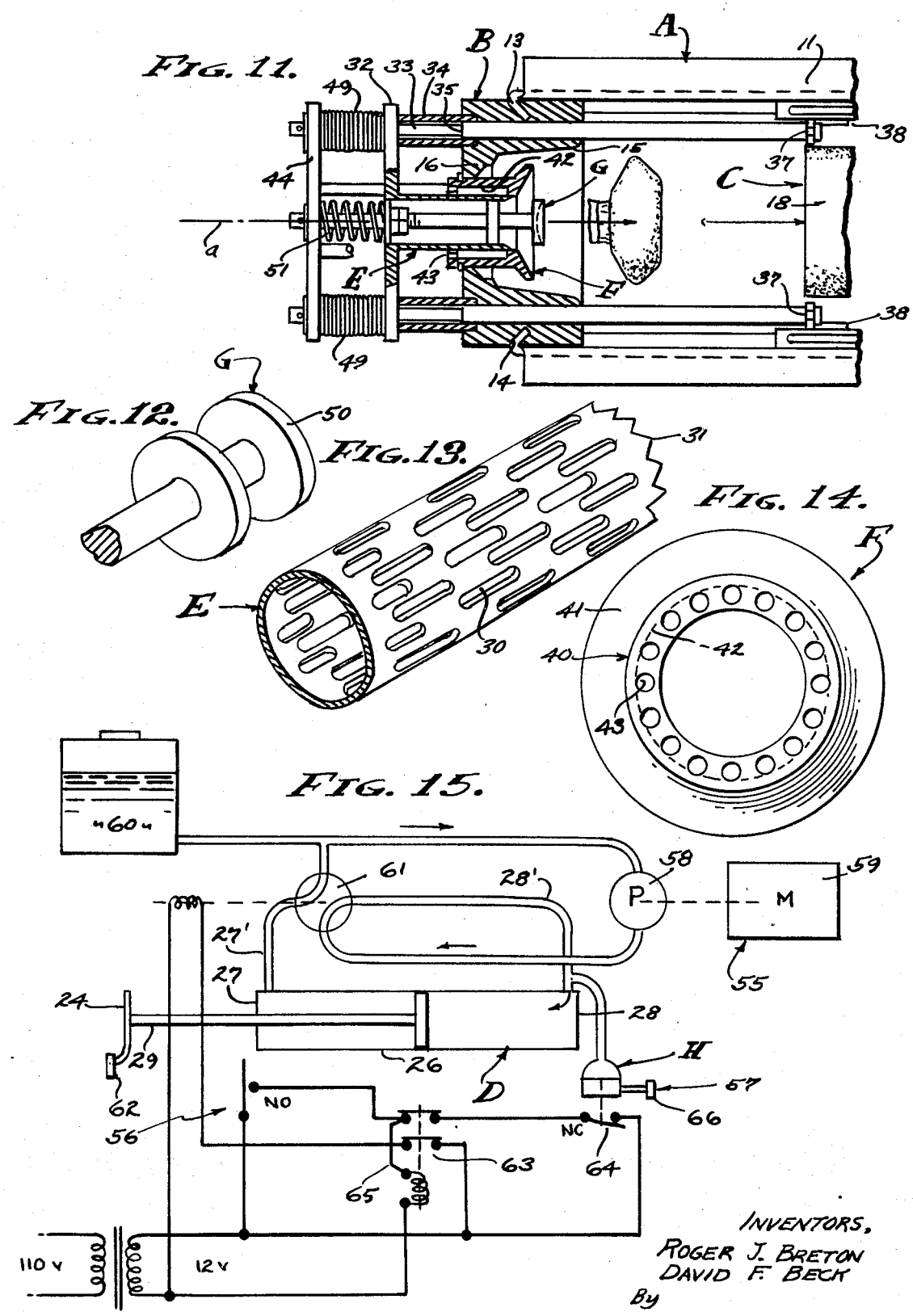

APPARATUS FOR CORING AND PRESSING JUICE FROM FRUITS HAVING A RIND

The art of extracting juice from citrus fruits having a rind has developed several methods and apparatus, and the type with which the present invention is concerned involves pressing of the fruit in order to squeeze out the juice through the rind and from the fibrous interior of the fruit. Heretofore, considerable complexity and expense has been involved in the carrying out of such methods and in the construction of apparatus to carry out the necessary mechanical functions, the timed relations of the processes and functions of apparatus coupled with the strength and durability required resulting in complex and heavy structures. Therefore, it is a primary object of this invention to apply prior art technology in a new and improved apparatus of reduced complexity and with the elimination of the usually accepted heavy and cumbersome mechanisms which dominate the prior art concepts. With the present inventive concept, economy is realized in construction costs, maintenance, reliability and in the space saving attributes, all of which is enhanced by the inherent capability of processing fruits of varied size and hardness.

An object of this invention is to eliminate heavy structure while retaining the ability to press the whole fruit substantially dry. Recognizing herein that the pressing of whole fruit involves the principles of hydraulics, in that liquid is to be extracted therefrom, the present invention meets said hydraulic requirements with hydraulic means created in a hydraulic ram and associated controls responsive to squeeze and release according to hydraulic requirements, and to the end that great force is applicable, for the most part, through static elements rather than through moving parts. Consequently, the apparatus herein disclosed is characterized by heavy structure restricted to the frame, pressing head and ram; the dynamic forces required being applied through hydraulics contained within a versatile system comprised mainly of a pump, a valve and connecting tubes.

It is an object to provide an apparatus of the type thus far referred to that conserves space by virtue of the adaptability of hydraulics to be advantageously positioned. Therefore, the apparatus of the present inventive concept is in actual practice about one-third the size of the comparable prior art apparatus.

It is another object to provide an apparatus of the type thus far referred to that responds to applied pressure regardless of fruit size or hardness, whereby variations in the fruit are automatically compensated for.

It is also an object of this invention to collect said juice externally of the rind, as distinguished from the projection of collection tubes into the fruit. The apparatus hereinafter disclosed provides for the pressing of juice through a core extruded from the whole fruit and for the collection of juice conducted through said core. It is to be observed that the extruded core remains attached to the whole fruit by means of the interior fibers thereof.

It is still another object of this invention to reliably eject the extruded core comprised of a collection of compressed fibers and some solids or pulp; and all of which is accomplished by means of a unique tubular screen portion of the coring knife. With the present invention, there is a core ejector which is yieldingly biased and which shears the pulp at the screen perforations when pressing force is released, thereby to express the core with impetus and which also carries the remaining whole rind out of the pressing head of the apparatus.

The various objects and features of this invention will be fully understood from the following detailed description of the typical preferred form and application thereof, throughout which description reference is made to the accompanying drawings, in which:

FIG. 1 is a perspective view of the hydraulic apparatus of the present invention.

FIG. 2 is a side elevation of the apparatus and its supply and disposal features.

FIG. 3 is an enlarged plan view taken as indicated by line 3—3 on FIG. 2.

FIGS. 4, 5, 6 and 7 are transverse sectional views taken as indicated by lines 4—4, 5—5, 6—6 and 7—7 on FIG. 2.

FIGS. 8, 9, 10 and 11 are each a fragmentary view of a portion of the apparatus as shown in FIG. 3, each illustrating a positioning of the apparatus necessary to the process performed thereby.

FIG. 9a is an enlarged fragmentary sectional view illustrating the coring knife and separate core and rind ejectors which characterize the invention.

FIG. 12 is a perspective illustration of the core ejector.

FIG. 13 is a perspective view of the coring knife.

FIG. 14 is an end view of the rind ejector, and,

FIG. 15 is a diagram of the pressure operative and sensitive hydraulics.

The method employed involves the pressing of juice from whole fruit having a rind, and especially from citrus fruits. Such fruits are of a kind but vary widely in size and hardness, and the rind thickness thereof varies as well. For example, oranges of the same crop vary in diameter, size and character; variable as to hardness, internal structure, and consistency of the fibers and pulp. Furthermore, the range of size between grapefruits and limes is quite substantial, it being an object herein to accommodate all such citrus fruits for juicing by one and the same process and in one and the same apparatus or machine; and with or without alteration or adaption. For example, the pressing head and ram head can be replaceably employed in varied size ranges depending upon the particular fruit to be juiced, a feature of the method and apparatus being that a wide range of fruit sizes can be accommodated within one head-ram size. Accordingly, the method comprises the separate and distinct steps of: First, supporting a fruit; second, cutting an opening in the fruit; third, confining the fruit; fourth, applying external pressure to the fruit and thereby extruding a core and displacing juice from the fruit via said opening and through said core; and fifth, to sense a predetermined build-up of said external pressure and thereafter release the same. This process is unique in the extrusion of a core from the interior of the whole fruit and in the utilization of said core to conduct juice from said interior, whereby the juice is extracted from the whole fruit at the exterior of its rind.

The first step of supporting the fruit is performed without force applied thereto and without deformation of the whole fruit. The purpose of the supporting step is solely for the location of and for holding the whole fruit positioned preparatory to the second step of the juicing process. This is a loose support for positioning purposes and is to be distinguished from complete embracement which characterizes so many of the prior art processes. Rotational orientation of the fruit is unimportant.

The second step of cutting an opening in the fruit is performed by the application of forces applied to one side of the supported whole fruit, incising a portion of the rind so as to separate it from the surrounding rind area but without separating it from its fibrous connection with the interior of the whole fruit. Thus, the incised area of the rind remains connected with the whole fruit. In practice, the incised area is round, substantially smaller in diameter than the whole fruit diameter, and it is necessarily coaxial with a radial axis extending through the center of the fruit.

The third step of confining the fruit is performed by the transfer of the whole fruit from the first mentioned support and into surrounding confinement of the intact rind, excluding confinement of the incised area of the rind. Thus, the area of the rind which is excluded from confinement is aligned with the axis of and is complementary with the said incised area of the rind.

The fourth step of applying external pressure is performed so as to compress the rind and interior fibers into a compaction of fibrous solids as a result of extruding a core of cross section determined by the incised area configuration, accompanied by displacement of juice from the fruit interior and which flows through the core via the opening made by the incision. In practice, the compacting force or pressure application is made in opposition to an area of the rind encompassing the said incised area. The compaction of fibers forming the said core establishes a filter body through which the juices are delivered at the exterior of the intact rind surrounding the incised portion thereof.

The fifth step of sensing a predetermined build-up of the applied external pressure is operative without regard to fruit size or hardness, and is an inevitable condition that is used advantageously to release the external pressure; thereby completing the juicing process. The said inevitable condition is evidenced by the substantially complete deliverance of juice from the whole fruit, whereupon the remaining rind and internal fibers and pulp are compacted to a degree where further compression is practically impossible, and at which point a sharp pressure increase or build-up is sensed and employed to cause a release of said applied pressure. It will be seen that the completed juicing process extracts substantially all liquid from the whole fruit, leaving the rind and fibers and pulp substantially dry.

Referring now to the apparatus, a typical embodiment in the form of an orange juicing machine is shown throughout the drawings, there being included therein generally, a frame A, a pressing head B, a ram head C, a hydraulic motor D moving the ram head C relative to the pressing head B, a perforated coring knife E and means positioning the same coordinated with movement of the ram head C, a rind ejector F and means positioning the same coordinated with movement of the ram head C, a core ejector G, and reversible power means H for applying hydraulic pressure to the motor D. These elements A through H are cooperatively combined in a unit apparatus X that is supplied from a storage bin Y, there being an agitating fruit delivery means J coordinated with movement of the ram head C to drop one single whole fruit at a time into the aforementioned supported position; and all of which discharges processed whole fruit rinds into a bin Z, there being a trap K to support the one whole fruit when initiating the juicing process and coordinated with the movement of the ram head C to pass said pressed rind into the bin Z upon completion of the juicing process.

The frame A is best illustrated in FIGS. 1 and 3 and comprises a mounting platform 10 and spaced parallel side members 11 carried by the platform and between which the pressing head B and ram head C operate. The frame A is shown as a heavy sheet metal fabrication with suitable flanges for stiffening and characterized by a bulkhead 12 between one end of the spaced members 11 and by opposed tracks 13 at the other end thereof. The bulkhead 12 forms a base to mount the motor D, while the tracks 13 releasably mount the pressing head B at said other end of the side members 11. In practice, the tracks 13 are vertically disposed flanges disposed at acute angles with respect to the planes of the side members; thereby presenting a dovetailed track configuration.

The pressing head B is removably and/or releasably mounted between the side members 11 at the said other end thereof, by means of slots 14 that are complementary to the tracks 13, there being a suitable stop (the platform 10) to hold the head in an aligned position on an operational axis $a$. The pressing head B comprises a fruit receiving bore 15 opening inwardly toward the bulkhead 12, bore 15 being divergently flared toward its opening and sufficiently large in diameter to receive the whole undeformed fruit to be juiced. The outer end of the bore 15 terminates at an inwardly turned flange 16 of limited radial extent, the said other end of the bore 15 being open to receive (reciprocably) the coring knife E, and the two ejectors F and G. In practice, the pressing head B can be formed of a rectangular solid, as shown in FIG. 1, with the coordinating means of the apparatus carried thereby adjacent to the outer face 17 thereof.

The ram head C is shiftable along the axis $a$ and comprises, a piston 18 of elastomeric material adapted to enter the bore 15 and seal therewith, and a ram 19 that forwardly deforms the piston thereby to apply external pressure to the whole fruit within the bore. The piston 18 is a cylindrical solid of rubber or the like having a concaved forwardly faced wall 20 and a surrounding peripheral wall 21 adapted to slide into and to seal with the inner diameter wall of the bore 15. The peripheral wall 21 is backed by a presser ring 22 that is yieldingly urged forwardly by a spring means 23 carried reciprocably by a cross head 24 that is shifted by the motor D. The ram 19 is rigidly carried by the cross head 24 and enters through the presser ring 22 to press the wall 20 forwardly and to evert the same into a convex configuration, or the like, as best illustrated in FIG. 9; thereby exacting external pressure upon the whole fruit and pressing it dry. The piston 18 is of sufficient body to permit flow of the elastomer into the various configurations shown for example in FIGS. 8 through 11.

The hydraulic motor D is preferably a liquid operated cylinder and piston motor adapted to reciprocate forwardly and rearwardly, and which comprises a cylinder 26 closed by cylinder heads 27 and 28, and a piston and rod 29 that projects reciprocably through the head 27. The motor D is double acting and has a fluid line 27' entering the cylinder at head 27, and a fluid line 28' entering the cylinder at head 28. As shown, the closed head 28 is mounted to the bulkhead 12 with the axis of the piston and rod 29 coincidental with the operational axis $a$. The cross head 24 is rigidly carried by the exposed and reciprocably movable end of the rod 29, thereby moving the piston 18 and ram 19 as hereinabove described.

The coring knife E is a thin walled elongated tubular member that is characteristically perforated and formed so as to have a screen 30 following a sharpened incising edge 31. It is preferred that the knife E be tubularly cylindrical with a serrated sharpened leading edge 31 smaller in diameter than the whole fruit being juiced, and in accordance with the invention the knife E is held coaxial with the axis $a$ and the sharpened end thereof retractable from the bore 15 of the pressing head B. The projected fruit receiving position thereof is best illustrated in FIGS. 3 and 8, while the retracted juicing position thereof is best illustrated in FIG. 9. The latter retracted position permits eversion of the piston 18 without incising the other side of the whole fruit rind, and thereby assures extraction through the incision through the one side of the fruit. A feature is the sealing of the rind with the bottom of the ejector F, so that peel oil is excluded and also so that there is no leakage of juice out of the fruit except through the extruded core thereof.

The means positioning the coring knife E is carried by the pressing head B and is responsive to the advancement of the cross head 24. The means now under consideration comprises a header 32 that is movably carried "to and from" the face 17 by guide posts 33, preferably a pair of spaced posts 33, one at each side of the head B and projecting therefrom on parallel axes. The foremost "to" position of the header 32 is restricted by a pair of like stop sleeves 34, while the header 32 is slideably carried over the outer end portions of the post 33 to seat upon lift shoulders thereof at 35. The posts 33 are reciprocably carried in openings through the head B to slide therein, and they are spaced to be engaged and reciprocated forwardly by the cross head 24, in order to lift the header 32 "from" the face 17. In practice and for purposes hereinafter described, the posts 33 are coupled directly to lost motion slides 36 which are shifted directly by the cross head 24 and which transfer motion to said posts. The said coupled engagement is effected by upwardly opening slots in the slides at 37 and which receive spooled ends of the post 33 when the pressing head B is installed. The coring knife E is rigid with the header 32 and is held thereby to reciprocate on the axis $a$, there being abutments 38 engaging the cross head 24 that shift the posts 33 and knife E when the cross head moves between the foremost positions as shown in FIGS. 8 and 9.

The rind ejector F is a tubular member that surrounds the coring knife E and which is characteristically manifolded to collect liquids that are hydraulically extracted from the whole fruit and delivered through the extruded core and from the screen 30. The ejector F comprises, a cylindrical manifold 40 reciprocably carried within the flange 16 of head B, and a chamber bottom 41 projecting radially from the manifold and to the inner diameter wall of bore 15, at the bottom thereof and to stop forwardly against said flange. As best shown in FIGS. 8 and 9, the bottom 41 establishes a movable concaved wall engageable with the rind of the fruit surrounding the incision therein, while the manifold 40 has an inner diameter wall 42 that surrounds the coring knife E with clearance so as to form an annulus for the collection of juice. As best illustrated in FIG. 9a, the screen 31 permits the radially outward flow of juice from the extruded core and into the manifold annulus, from which the juice is discharged through delivery ports 43.

The means positioning the rind ejector F is carried by the pressing head B and is responsive to the retraction of the cross head 24. The means now under consideration comprises a depressor 44 that engages and moves the ejector F from the flange 16 and to an ejecting position as shown in FIG. 11, and after such extreme positioning the depressor returns partially as best illustrated in FIG. 3, the depressor 44 being carried "to and from" the face 17 by the guide posts 33 with a "from" limit established by stop 46. The rearmost "from" positioning is shown in FIG. 11, there being abutments 45 (shown in FIG. 3) engaging the cross head 24 that shift the posts 32 and thereby move the depressor to engage the rind ejector F. The depressor 44 is yieldingly held against the stops 35 by spring means 49 and a snap ring 47' maintains assembly of the rind ejector, operable between the extreme positions shown. Note the lost motion of the slide 36 with respect to the cross head 24, as effected by the distance between the abutments 38 and 45 (see FIG. 3) thereby to effect retraction of the coring knife E at the forward end of travel, and protraction of the ejector F at the rear end of travel.

The core ejector G reciprocates within the coring knife E to yield to the core that extrudes from the interior of the fruit when external pressure is applied thereto. Accordingly, the ejector is yieldingly biased to resist extrusion of the fruit core and thereby controls the compaction thereof, permitting the said core to enter into the screen 31 to be compacted therein and to act as a filter for the juice that flows through and from the core for delivery radially through the screen 31. The core ejector G initially moves with the coring knife E until the header 32 is stopped by the sleeves 34, and is so moved by the depressor 44 that is held extended by the compression spring means 49 operable against the header 32. The ejector G comprises, a plunger 50 reciprocably carried within the screen 30 of knife E, and a spring means 51 yieldingly urging the plunger 50 to be protracted from the rind ejector (see FIG. 11). A stop 52 limits retraction of the plunger 50, the stop 52 being positioned so as to permit protraction of the plunger 50 substantially beyond the knife edge 31, after the spring means 51 is fully compressed so as to positively force the plunger 50 to move to the edge 31 thereby shearing all fibers occuring through the perforations of screen 30. As a consequence, the final shearing of fibers occurs as shown in FIG. 10, in which position the spring means 51 is fully compressed and whereupon the extruded core is released and accelerated and ejected with the rind attached thereto (see FIG. 11).

The reversible power means H that applied hydraulic pressures to the motor D is shown physically in FIG. 1 and diagrammatically in FIG. 15. As above described, the motor D is a double acting cylinder and piston unit having two directions of movement, o either advance or to retract the ram head C. Accordingly, the means H comprises, a hydraulic pressure source 55, means 56 to advance the motor upon retraction thereof, and means 57 to retract the motor upon build-up of fluid pressure therein. The pressure source 55 is preferably a liquid pump 58 continuously driven by an electric motor 59, said pump drawing liquid from a reservoir 60 and delivering liquid under pressure to a solenoid opened valve 61. The valve 61 is a four-way valve adapted to charge either head of the motor D while exhausting the other respectively, and to advance the piston and rod 29 when the solenoid thereof is electrically energized. The means 56 comprises a normally open switch closed by an operator 62 on the cross head 24 when it is fully retracted and a normal open holding relay 63 that is closed thereby. The means 57 to retract the piston and rod 29 comprises a pressure responsive normally closed switch 64 in a series holding circuit 65 through the relay 63, and operative to drop the electrical circuit to the solenoid of valve 61. As a consequence, there being a condition of equilibrium between the force externally applied to the whole fruit ahead of the ram head C and the force applied within the motor D, the reversible means H is sensitive to the force exerted and is set a predetermined pressure by means of a suitable adjustment 66 to retract the ram head C regardless of the size and hardness of the whole fruit being juiced.

The means J for delivering one whole fruit at a time is coordinated with movement of the cross head 24 that shifts the ram head C, and is best illustrated in FIG. 2. Means J both agitates and delivers one whole fruit for each cycle of operation and comprises, a roller 70 carried on the cross head 24 and a cam follower 71 pivoted in the storage bin Y. Upon complete retraction of the cross head 24 the follower 71 drops a gate 72 that lowers one whole fruit into delivery position. Upon continued and initial forward movement of the cross head 24 the follower 71 lifts the gate 72 which then boosts said one whole fruit out of delivery position and drops it between the pressing head B and ram head C. Referring to the phantom position shown in FIG. 2, the trap K comprises a cam 74 engageable with a rail 75 movable with the cross head 24. Engagement of the rail with the cam swings the trap upwardly and supports the whole fruit immediately following return from the fully retracted position, and so as to guide the whole fruit into the bore 15 when the ram head C moves forwardly into engagement therewith.

From the foregoing it will be seen that the method is condusive to the efficient production of high quality juice, and that the apparatus is versitile in its operation to accommodate a wide range of fruit sizes regardless of hardness or rind thickness. It is to be observed that the collection of extracted juice is exclusively from the interior of the whole fruit, and that excess peel-oil is excluded by virtue of isolation of the rind exterior and of the rind remaining substantially intact, followed by filtration of juice through the protracted core. It is significant that a circular or like incision is made through the rind at one side of the fruit and that the externally applied pressure affects hydraulic extrusion of a core into the tubular knife. By perforating the knife the juice is screened while being forced into the manifold 40 where it is first collected by the apparatus and thereafter delivered through port 43. Operation of the ejectors F and G clears the screen 30 and frees the compacted core and attached rind, whereupon the apparatus is readied for a new cycle of operation. Continuous operation of the pressure source 55 results in automatic and substained operation of the apparatus, responsive in each instance to fruit size and hardness.

Having described only a typical preferred form and application of out invention, we do not wish to be limited or restricted to the specific details herein set forth, but wish to reserve to ourselves any modifications or variations that may appear to those skilled in the art.

Having described our invention, we claim:

1. Apparatus for juicing whole fruit having a rind and comprising, a frame carrying a pressing head and a reciprocating ram head disposed on an operational axis and separable therealong to receive a whole fruit therebetween, the pressing head having a bore therein terminating at an inwardly turned flange and to receive and seal with the ram head and confining said whole fruit, a retractile rind ejector of tube form having an outwardly turned flange engageable with and complementing the inwardly turned flange of the pressing head and reciprocably carried thereby within the bore of the pressing head and having a bottom opposed to the whole fruit received therein, a tubular coring knife with a perforated wall for radial discharge of juice and coaxially carried within the rind ejector and with a sharpened open end projecting to incise a corresponding diameter area of rind at one side of the whole fruit, means advancing the ram head into the pressing head applying external pressure to said whole fruit and extruding the juice thereof through said tubular coring knife for discharge from the said bottom of the said ejector and thereafter retracting the ram head from the pressing head, and means protracting the rind ejector toward the retracting ram head.

2. The apparatus for juicing whole fruit having a rind as set forth in claim 1 wherein the rind ejector of tube form has an extended inner diameter wall spaced from the outer diameter wall of the coring knife and receiving said radial discharge for collection of juice and delivery thereof outside the pressing head when said rind ejector is protracted.

3. The apparatus for juicing whole fruit having a rind as set forth in claim 1 wherein the rind ejector of tube form has an extended inner diameter wall spaced from the outer diameter wall of the coring knife and receiving said radial discharge and has an axial port remote from the pressing head for collection of juice and delivery thereof outside the pressing head when said rind ejector is protracted.

4. Apparatus for juicing whole fruit having a rind and comprising, a frame carrying a pressing head and a reciprocating ram head disposed on an operational axis and separable therealong to receive a whole fruit therebetween, a tubular coring knife with a perforated wall for radial discharge of juice and disposed on said axis with a sharpened open end projecting to incise an area of rind at one side of the whole fruit, the ram head being engageable with the pressing head and sealing therewith with the whole fruit confined therebetween, there being an opening in the pressing head receiving the said tubular coring knife, a core ejector coaxially carried within the tubular coring knife and movable therein between a limited retracted position and a protracted position, means advancing the ram head into the pressing head applying external pressure to said whole fruit and extruding said area of rind into the coring knife and depressing the core ejector to said limited retracted position forming a core of compacted fruit fibers contiguously attached to intact fibers within the whole fruit and through which displaced juice is filtered and discharged radially through said perforations and thereafter retracting the ram head from the pressing head, and means protracting the core ejector toward the retracting ram head.

5. The apparatus for juicing whole fruit having a rind as set forth in claim 4 wherein the core ejector has an outer diameter wall in cutting proximity to the inner diameter wall of the coring knife to shear fruit fibers from the compacted core entering the perforations.

6. The apparatus for juicing whole fruit having a rind as set forth in claim 4 and wherein the means protracting the core ejector includes a spring means compressed to said limited retracted position of the core ejector by said depression of the core ejector yielding to extrusion of the said area of rind and fruit fibers into the coring knife.

7. The apparatus for juicing whole fruit having a rind as set forth in claim 6 and wherein the means protracting the core ejector includes, a positive mechanical connection to the ram head and responsive to retraction thereof, and spring means compressed to said limited retracted position of the core ejector by said depression of the core ejector yielding to extrusion of the said area of rind and fruit fibers into the coring knife.

8. The apparatus for juicing whole fruit having a rind as set forth in claim 4, wherein the core ejector has an outer diameter wall in cutting proximity to the inner diameter wall of the coring knife to shear fruit fibers from the compacted core entering the perforations, wherein the means protracting the core ejector includes, a positive mechanical connection to the ram head and responsive to retraction thereof to project the core ejector over the perforations in the coring knife, and a spring means fully compressed to said limited retracted positions of the core ejector by said depression of the core ejector yielding to extrusion of the said area of rind and fruit fibers into the coring knife and operable upon retraction of the ram head to project the core ejector to a protracted position beyond the coring knife.

9. Apparatus for juicing whole fruit and comprising, a frame carrying a pressing head and a reciprocating ram head, said pressing head and ram head being disposed on an operational axis and separable therealong to receive a whole fruit therebetween, the pressing head having a bore therein to receive and seal with the ram and confining said whole fruit, a retractile rind ejector of tube form disposed on said axis and reciprocably carried in the pressing head and having a bottom opposed to the ram received therein, a tubular coring knife coaxially carried within the rind ejector and having a perforated wall for radial discharge of juice and with a sharpened open end projecting to incise an area of rind at one side of the whole fruit, means advancing the ram head into the pressing head applying external pressure to said whole fruit and extruding the juice thereof through said tubular coring knife for discharge therefrom and thereafter retracting the ram head from the pressing head, a core ejector coaxially carried within the tubular coring knife and movable therein between a limited retracted position and a protracted position, said external pressure depressing the core ejector to said limited retracted position forming a core of compacted fruit fibers contiguously attached to intact fibers within the whole fruit and through which displaced juice is filtered and discharged radially through said perforations, means protracting the rind ejector toward the retracting ram head, and means protracting the core ejector toward the retracting ram head.

10. The apparatus for juicing whole fruit having a rind as set forth in claim 9, wherein the rind ejector of tube form has an extended inner diameter wall spaced from the outer diameter wall of the coring knife and receiving said radial discharge for collection of juice and delivery thereof outside the pressing head when said rind ejector is protracted, and wherein the core ejector has an outer diameter wall in cutting proximity to the inner diameter wall of the coring knife to shear fruit fibers from the compacted core entering the perforations.

11. The apparatus for juicing whole fruit having a rind as set forth in claim 9, wherein the tubular coring knife is retractably carried within said rind ejector, there being means responsive to the advancement of the ram head to project the said knife to incise the said area of the rind and to retract the same when external pressure is applied to said whole fruit, wherein the rind ejector of tube form has an extended inner diameter wall spaced from the outer diameter wall of the coring knife and receiving said radial discharge for collection of juice and delivery thereof from the apparatus, and wherein the means protracting the core ejector includes a positive mechanical connection to the ram head and responsive to retraction thereof.

12. The apparatus for juicing whole fruit having a rind as set forth in claim 9, wherein the tubular coring knife is retractably carried within said rind ejector, there being means responsive to the advancement of the ram head to project the said knife to incise the said area of the rind and to retract the same when external pressure is applied to said whole fruit, wherein the rind ejector of tube form has an extended inner diameter wall spaced from the outer diameter wall of the coring knife and receiving said radial discharge and has an axial port remote from the pressing head for delivery thereof outside the pressing head when said rind ejector is protracted, wherein the core ejector has an outer diameter wall in cutting proximity to the inner diameter wall of the coring knife to shear fruit fibers from the compacted core entering the perforations, wherein the means protracting the core ejector includes, a positive mechanical connection to the ram head and responsive to retraction thereof to project the core ejector over the perforations in the coring knife, and a spring means fully compressed to said limited retracted position of the core ejector by said depression of the core ejector yielding to extrusion of the said area of rind and fruit fibers into the coring knife and operable to project the core ejector to a protracted position beyond the coring knife.

13. Hydraulically operative and pressure responsive apparatus for juicing whole fruit having a rind and of varied size and hardness and comprising, a fixedly positioned pressing head, a ram head reciprocably opposed to the pressing head and separable therefrom to receive a whole fruit therebetween, a hydraulic motor to reciprocably move the ram head relative to the pressing head and all operable on an axis, reversible fluid pressure power means to advance and retract the motor and including, means responsive to retraction thereof to advance the motor and fluid pressure responsive means to terminate advancement and to retract the motor.

14. The hydraulically operative and pressure responsive apparatus as set forth in claim 13 and wherein the means responsive to retraction of the motor includes a position responsive valve charging and exhausting the motor to move in advance.

15. The hydraulically operative and pressure responsive apparatus as set forth in claim 13 and wherein the fluid pressure responsive means includes a pressure responsive valve charging and exhausting the motor to move in retraction.

16. The hydraulically operative and pressure responsive apparatus as set forth in claim 13 wherein the means responsive to retraction of the motor includes a position responsive valve charging and exhausting the motor to move in advance, and wherein the fluid pressure responsive means includes a pressure responsive valve charging and exhausting the motor to move in retraction.

17. The hydraulically operative and pressure responsive apparatus as set forth in claim 13 and wherein the means responsive to retraction of the motor includes a solenoid operated valve responsive to a position switch closed upon retraction of the motor and positioned thereby to charge and exhaust the motor to move in advance.

18. The hydraulically operative and pressure responsive apparatus as set forth in claim 13 and wherein the fluid pressure responsive means includes a solenoid operative valve responsive to a relay having a holding circuit opened by a pressure operated means communicating with the fluid pressure power means and operating the valve to charge and exhaust the motor to move in retraction.

19. The hydraulically operative and pressure responsive apparatus as set forth in claim 13, wherein the means responsive to retraction of the motor includes a solenoid operated valve responsive to a position switch closed upon retraction of the motor and positioned thereby to charge and exhaust the motor to move in advance, and wherein the fluid pressure responsive means include a solenoid operated valve responsive to a relay having a holding circuit opened by a pressure operated means communicating with the fluid pressure power means and opening a switch to operate the valve to charge and exhaust the motor to move in retraction.

* * * * *